United States Patent
Bennett, III (10) Patent No.: US 7,153,206 B2
(45) Date of Patent: Dec. 26, 2006

(54) LOTTERY TICKETS WITH VARIABLE AND STATIC PRIZES WHERE THE VARIABLE REDEMPTION VALUES CHANGE UNDER CERTAIN PREDETERMINED EVENTS

(75) Inventor: Joseph W. Bennett, III, Sugar Hill, GA (US)

(73) Assignee: Scientific Gaines Royalty Corp., Alpharetta, GA (US)

( * ) Notice: Subject to any disclaimer, the term of this patent is extended or adjusted under 35 U.S.C. 154(b) by 889 days.

(21) Appl. No.: 10/370,317

(22) Filed: Feb. 14, 2003

(65) Prior Publication Data

US 2003/0181235 A1 Sep. 25, 2003

(51) Int. Cl.
*A63G 31/00* (2006.01)
*A63F 9/24* (2006.01)

(52) U.S. Cl. .......................................... 463/17; 463/17
(58) Field of Classification Search .................. 463/17
See application file for complete search history.

(56) References Cited

U.S. PATENT DOCUMENTS

| | | | | |
|---|---|---|---|---|
| 5,112,050 | A | * | 5/1992 | Koza et al. ..................... 463/17 |
| 5,286,061 | A | * | 2/1994 | Behm .............................. 283/95 |
| 5,791,990 | A | * | 8/1998 | Schroeder et al. ............. 463/17 |
| 5,992,892 | A | * | 11/1999 | Schaefer et al. ............... 283/81 |
| 6,102,395 | A | * | 8/2000 | Such ............................ 273/139 |
| 6,145,835 | A | * | 11/2000 | Such ............................ 273/139 |
| 2003/0042317 | A1 | * | 3/2003 | Behm et al. .................. 235/487 |

* cited by examiner

*Primary Examiner*—John M. Hotaling, II
*Assistant Examiner*—Tramar Harper
(74) *Attorney, Agent, or Firm*—Michael B. McMurry (57) ABSTRACT

In an instant lottery ticket game structure having a lottery administration host computer that includes a ticket validation file containing prize codes for at least some of the lottery tickets, provision for instant lottery tickets having variable redemption values can be made by allowing the prize codes in the validation file to be changed under certain predetermined circumstances. At least some of the lottery tickets in the game, whether printed or electronically simulated, can be provided with play indicia under a removable coating that indicates that the redemption value of that lottery ticket is variable. Using the host computer, a lottery administration can change the prize codes and therefore the redemption value of these instant lottery tickets according to the predetermined criteria such as the termination of a game. In some cases, a player can have the option to redeem an instant lottery ticket for a first value or wait until after termination of the game where a possibly higher redemption value might be assigned to that ticket due to the host computer randomly selecting that ticket to change its prize code to a greater value.

45 Claims, 3 Drawing Sheets

LOTTERY TICKETS WITH VARIABLE AND STATIC PRIZES WHERE THE VARIABLE REDEMPTION VALUES CHANGE UNDER CERTAIN PREDETERMINED EVENTS

FIELD OF THE INVENTION

The invention relates to lottery ticket game structures and in particular to lottery games where a game is printed on a set of instant tickets having play indicia indicating whether or not the ticket is a prize winner printed on the tickets underneath a scratch-off coating or where an image of an instant lottery ticket is displayed on a computer terminal or video lottery terminal having play indicia indicating whether or not the ticket is a prize winner.

BACKGROUND OF THE INVENTION

In most instant lottery ticket games a set of tickets is printed or in electronic games the tickets displayed on a computer or video lottery terminal screen with play or prize value indicia under a scratch-off coating according to a predetermined prize structure. For electronic tickets, termed "eTickets" the data is transferred from a central system or a site controller to the video lottery terminal. Typically, the prize structure consists of one or more large value prizes, a number of lesser value prizes and a large number of tickets that are not prizewinners. The prize values in a game are distributed randomly on the tickets so that in theory each player has an equal chance to win one of the prizes.

In certain circumstances, however, problems have arisen with this type of game structure. There are, for instance, certain lottery administrations in the United States that post on their web sites the remaining prizes within a game. As a result, a lottery administration might post, for example, that there are two $100,000 prizes in a particular game. As the game is sold, the tickets having the various prizes are cashed. In some cases, the game will still have a significant number of tickets to be sold after the top prizes are cashed. This can lead to complaints from customers that it is no longer possible to win one of the top prizes as advertised by the lottery administration in its general promotional literature. Moreover, state-run lotteries can include in their contract with the game vendor the restriction that players must have the opportunity to play for the top prize throughout the life of the game.

In many instant lottery systems, especially those in the United States that are administered by state governments, winning tickets are presented by players to lottery agents for redemption. In many cases, in particular where the ticket has a high value, the lottery agent will enter ticket identification or validation data from the ticket into an agent terminal using a bar code reader or manually inputting this data. This information is then transmitted to a host computer at the state lottery administration where this information is used to access a validation file. Typically, there is one record in the validation file for each such winning ticket that contains the redemption value of the ticket. This redemption value is transmitted to the lottery terminal and if the transmitted redemption value matches the printed winning value on the lottery ticket, the agent will pay this amount to the player. Similarly, in electronic lottery systems, winning eTicket vouchers are presented by players to lottery agents or lottery validation systems for redemption. In many cases, in particular where the eTicket has a high value, the lottery agent or system will transfer eTicket identification or validation data from the eTicket into an agent terminal via a bar code or manually inputting this data. This information is then transmitted to a host computer at the state lottery administration where this information is used to access a validation file. As with the instant ticket systems, there typically is one record in the validation file for each such winning eTicket that contains the redemption value of the ticket. This redemption value is transmitted to the agent terminal and if the transmitted redemption value matches the printed winning value on the voucher, the agent will pay this amount to the player. Usually the validation file contains a fixed or static prize value for all tickets that contain a winning prize value. However, while maintaining a static prize value for each ticket in the validation file has been considered desirable from a security standpoint, maintaining the static value reduces the flexibility of lottery administrations to create new types of games and to compensate for various problems such as the problem described above.

SUMMARY OF THE INVENTION

It is therefore an object of the invention to provide an instant or an electronic lottery game structure and supporting validation system that will encourage player interest throughout the duration of the game.

It is another object of the invention to provide an instant or an electronic lottery game structure and supporting validation system that will provide for an electronic mechanism to hold an End of Game Draw.

It is a further object of the invention to provide an instant or an electronic lottery game structure, both for traditional instant lottery tickets and electronic instant lottery tickets, having a dynamic prize structure option. This structure can include the player vehicle (the printed instant or the eTicket), file structures for implementing the game structure, an electronic draw mechanism, and processes and procedures that allow a lottery administration to account for the variable prizes from the beginning of the game until the game is closed.

Another object of the invention is to allow for the secure modification of information, such as the prize values for certain tickets, in the validation file.

Still another object of the invention is to provide the computer software and computer file structures that allow for the secure modification of information, such as the prize values for certain tickets, in the validation file.

It is still another object of the invention to provide an instant or an electronic lottery game structure where the winners of certain of the prize values for particular tickets are not determined until a predetermined time has elapsed or an event has occurred such as the end of the game. The prize values for these tickets can be, for example, determined at the end of the game by an electronic drawing.

Yet another object of the invention is to provide an instant or an electronic lottery game structure where at least certain of the tickets are specified as having dynamic or variable prize values that are changed periodically during the game. A ticket having one of these variable prize values can then be redeemed by a player for the specified prize value at a particular time during the game or the player can opt to wait until the game is over where a drawing determines the value of the ticket.

A further object of the invention is to provide a validation file where the prize value of at least a portion of the instant or the electronic lottery tickets can be changed by the lottery administration. For example, the validation file can include a sub file containing records for each of the tickets having a variable prize value. The sub file can be used to change the prize values at periodic intervals during the game for all of the tickets in the sub file and can be used to implement an electronic drawing for certain prize values at the end of the game. As an alternative to the sub file, the traditional validation file can include validation identifiers, such as a set of unique prize codes, that allow the traditional validation file to identify those prizes that are designated as having variable value or those prizes that are eligible for the electronic End of Game Draw.

DETAILED DESCRIPTION OF THE INVENTION

Figure 1:
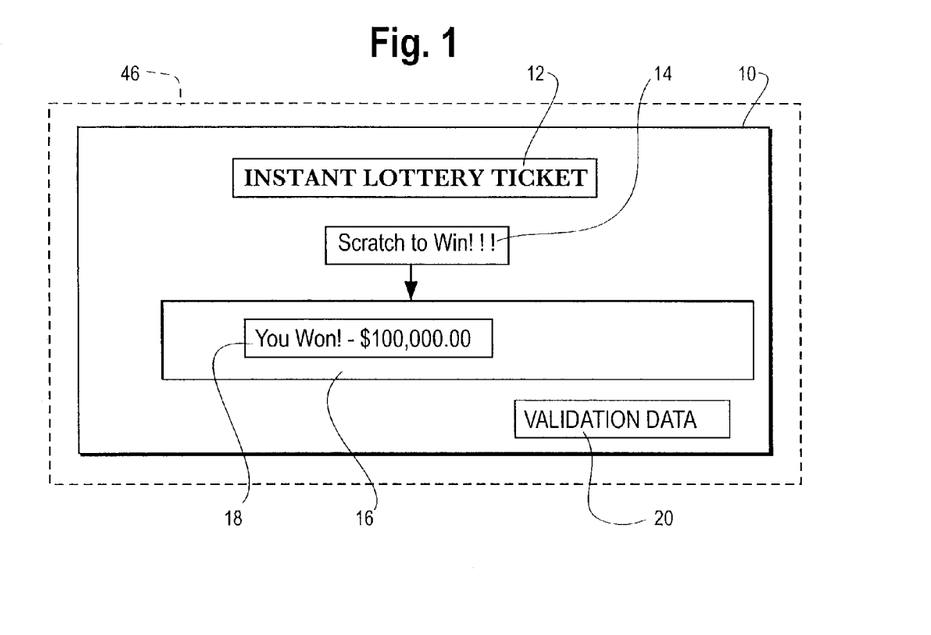
FIG. 1 is a front plan view of an instant or an electronic lottery ticket having a fixed prize value.

A first embodiment of the invention will be described in terms of a printed instant ticket with a scratch-off material covering play indicia. FIG. 1 is a simplified representation of a conventional instant lottery ticket 10 that includes a printed identification 12 of the ticket 10, a printed instruction 14 on how to play the ticket and a scratch-off material 16 covering a set of play indicia 18. Also, printed on the lottery ticket 10 is a set of validation data 20 that can be in alphanumeric or bar code form or both. The validation data 20 can be printed on the back of the lottery ticket 10 as well. In the representation of FIG. 1, the lottery ticket 10 is shown with most of the scratch-off material 16 removed which, in this case, reveals the play indicia 18 that indicates to the player that the prize value of the lottery ticket 10 is $100,000.00. In conventional instant lottery games, the tickets 10 are all printed with play indicia 18 that indicate the prize value of the lottery ticket 10.

Figure 2:
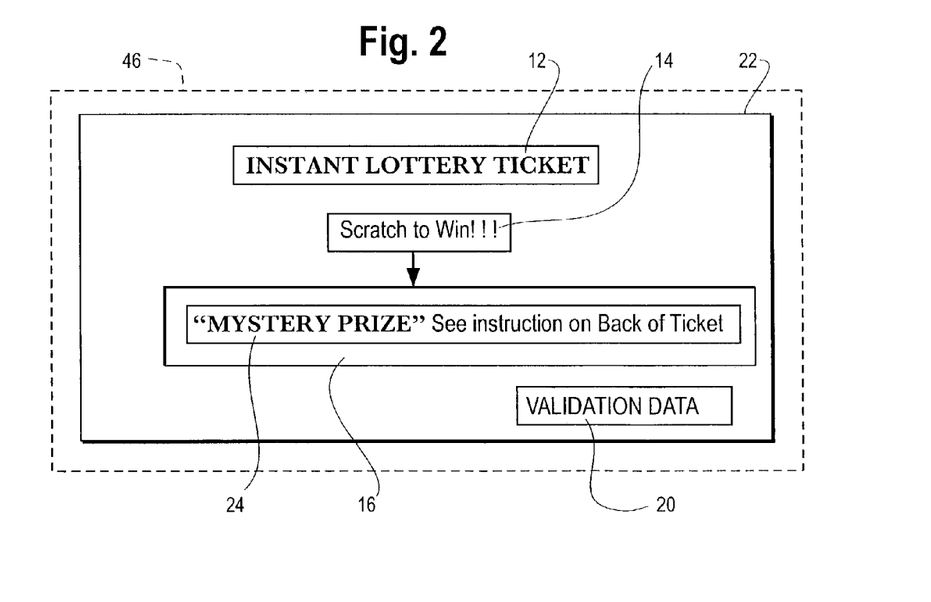
FIG. 2 is a front plan view of an instant or an electronic lottery ticket having a variable prize value according to the invention.

FIG. 2 is a simplified representation of an instant lottery ticket 22 according to one aspect of the invention. The principal difference between the lottery ticket 22 and the conventional lottery ticket 10 is that a set of play indicia 24 printed beneath the scratch-off material 16 on the lottery ticket 22 represents a variable prize value as indicated on the lottery ticket 22 by a coined term such as "MYSTERY PRIZE" as shown in FIG. 2 or "BONUS PRIZE". Here, the play indicia 24 also includes a message to the effect that the player should read instructions (not shown) on the back of the lottery ticket 22 that will provide guidance on how to redeem a prize for the lottery ticket 22. In the preferred embodiment of the invention, most of the lottery tickets in the game will be printed with play indicia representing the actual value of prize as shown at 18 on the ticket 10 in FIG. 1. Additionally, and evenly dispersed throughout the game, will be a set of the lottery tickets 22 having the printed play indicia 24 indicating a variable prize value. These tickets 22 will be dispersed evenly throughout the game and, preferably, in such volume to greatly increase the likelihood that at least one of the "Mystery" prize winning tickets 22 remains in the game at all times. In this embodiment of the invention, it is desirable that the odds are extremely high that at least one of the "Mystery" prize ticket 22 remain in the game after the last static top prize is sold.

If the last static top prize as shown at 18 on the ticket 10 is redeemed for cashing before all tickets in the game have been redeemed, at least one of the remaining 'MYSTERY' prize tickets 22 would be eligible to be 'promoted' to the top prize. This "Mystery" top prize would be distributed during the End of Game Draw procedure. In this manner, it would always be possible to win one of the top prizes as advertised by the lottery administration in its general promotional literature, and thus render moot any complaint that the top prize no longer remains in the game.

It is common practice that drawings of this type are conducted by a manual process whereby players mail in to the lottery a stub or some portion of the ticket. In the preferred embodiment, this manual system is replaced by an electronic system reducing the workload on the lottery and reducing the chance for fraud or error.

Figure 3:
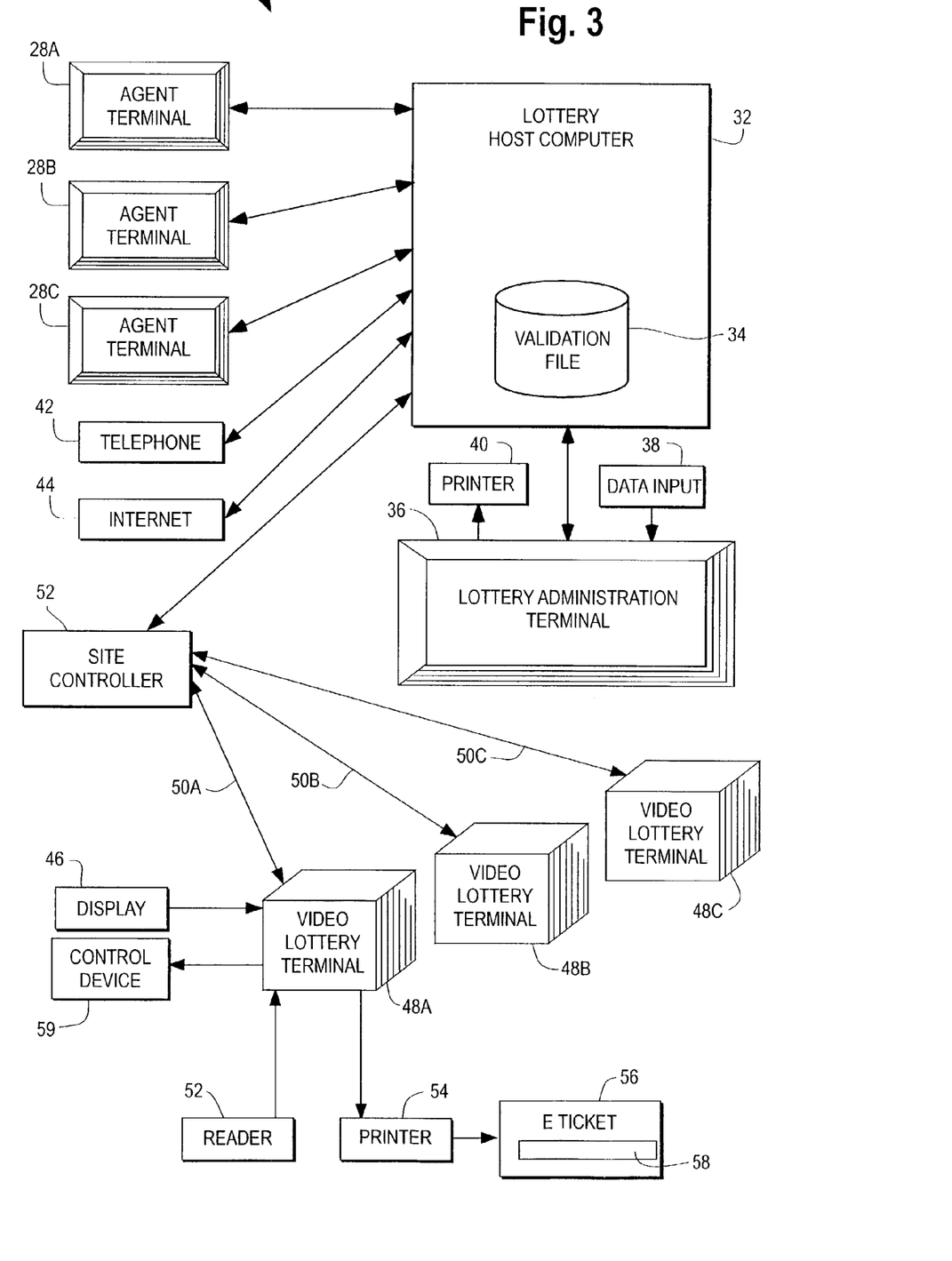
FIG. 3 is a block diagram of a lottery system according to the invention.
Figure 4:
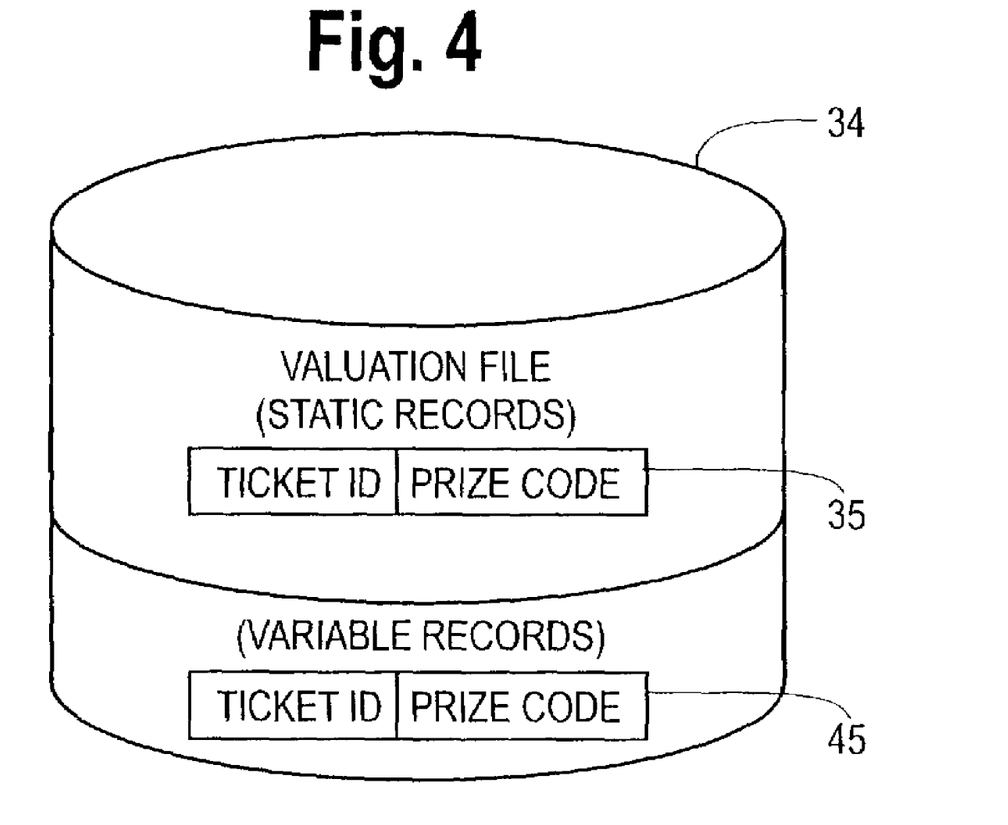
FIG. 4 is a block diagram of a validation file for use with the system of FIG. 3.

With reference to FIG. 3, operation of the preferred embodiment of the instant lottery game will be described. To illustrate a representative environment for the invention, FIG. 3 provides a block diagram of the basic hardware structure of a typical state administered lottery system 26 for selling and redeeming instant lottery tickets such as lottery tickets 10 and 22. Included in the system 10 is a lottery ticket redemption mechanism which in this embodiment can include a number of validation or agent terminals 28A–C that are connected, as represented by a set of lines 30A–C, to a lottery host computer 32. The agent terminals 28A–C usually include bar code readers, keyboards, displays and printers that a lottery agent can use for selling, validating and redeeming instant lottery tickets. The connections 30A–C to the host computer 32 can be dedicated or dial-up telephone lines or other methods of communication such as satellite communications systems. Included in the host computer 32 is a validation file 34 that contains validation information for lottery tickets usually stored in the form of records each having a ticket identification and a prize code as represented generally at 35 as shown in FIG. 4. The prize code can be a code or the actual prize or redemption value of the lottery ticket 10 or 22. Usually there is one record 35 for winning lottery tickets that requires validation through the host computer 32. However in some cases, the validation file 34 contains records 35 for only the winning lottery tickets in a game or contains records 35 for all of the tickets in the game. Connected to the host computer 32 is a lottery administration terminal 36 that usually contains or is connected to a data input device 38 such as a compact disk (CD) reader along with a printer 40 for printing out reports to the lottery administration. Also in some state lotteries, the lottery administration provides information to the public via an access system regarding the status of a game by, for example, a toll free telephone number as represented by a block 42 and, or in some cases, by Internet access represented by a block 44

It is typical practice in the United States lottery industry for a ticket vendor to provide a state lottery administration with one or more sets of tickets where each set is defined as a game. Each game will normally have a prize structure with a predetermined number of winning tickets and a predetermined number of losing tickets. Very often the winning tickets are divided between high tier winners, which have a high winning prize value and low tier winners that have relatively low winning values. It is also industry practice for the vendor to supply the validation file 34 for each game, which is generally structured to contain one record 35 having the prize code for each winning ticket in the game. In conventional game structures, the prize value represented by the prize code in each record 35 provided by the vendor is fixed or static. For some games, the validation file 34 will contain a record 35 for each winning ticket or in some cases, the validation file 34 will contain a record 35 for each lottery ticket in the game. This vendor supplied validation file is then loaded into the host computer validation file 18 using the data input device 38. In many state lotteries the practice is to require that high tier lottery tickets that are presented by a player to a lottery agent for redemption be validated by having the lottery agent transmit ticket identification information or the validation data 20 from the agent terminal 28A to the host computer 32. This information is then used to access the record 35 in the validation file 34 that contains the prize code or redemption value for the lottery ticket 10 and this value is then transmitted back to the agent terminal 28A. The usual practice is to have the lottery agent compare this value from the host computer 32 with the winning value 18 printed on the lottery ticket 10 and if they are the same, the agent will pay the player this amount or provide the player with a form that he can use to redeem the ticket from the lottery administration.

Referring to FIG. 4, in one embodiment of the invention, an instant lottery game structure is provided where a subset of the lottery tickets, such as the lottery ticket 22, is printed with the play indicia 24 which indicates to a player that the prize can have a variable value. The rest of the lottery tickets in the game, such as lottery ticket 10, are printed with play indicia 18 that have a static prize value and for a large number of the lottery tickets 10 the play indicia 18 will indicate that the lottery ticket 22 has no redemption value. In the validation file 34, the first set of records 35 corresponds to the lottery tickets 10 that have static prize values and a second set or a sub file of records 45 corresponds to the lottery tickets 22 that have variable prize values. Other methods that identify the variable prizes within the ticket population in a game can be used as well, such as a special prize code unique to variable prize tickets. In the preferred embodiment, the initial prize values represented by the prize codes in each of the records 45 in the sub file will have the same relatively low value, for example $50.00, at the beginning of the game. For other embodiments, each initial prize code can have a different value or even a null value. Here, the $50.00 value represents the prize value that the lottery tickets 22 in the sub file 45 can be redeemed for, at least at one point, during the time period that the game is being marketed to the public. In addition, the host computer 32 can automatically at periodic intervals change the prize values in the records 45 in the validation sub file. These changes can be random within a certain predetermined range or alternatively, the changes in the prize values can be made by the host computer 32 in response to inputs from the lottery administration via the terminal 36. For example, the lottery administration can, by using this system, alter the redemption value of the variable tickets 22 to increase ticket sales or as a part of its marketing plan as it relates to a specific dynamic prize structure for the game. The host computer 32 will mark as paid the records 45 in the sub file that represent lottery tickets 22 that are redeemed during the game period. Then, preferably at a publicly announced date after the termination of the game period, the host computer 32 would perform an electronic draw based on all or a subset of the records 45 in the sub file to determine the winner of the final top prize in the game. Alternatively, the system could be used to distribute all remaining, unredeemed prizes in the game among those players who hold a 'mystery' prize winning ticket 22. If, for example, there were one thousand records 45 in the mystery prize sub file and the lottery administration wished to distribute one hundred high tier prizes that remained in the game, the electronic draw program in the host computer 32 would randomly distribute those remaining prizes into the one thousand records 45 in the sub file. Normally, the lottery administration would establish the total prize payout before the beginning of a game. One of the primary advantages of the system described above is that, the lottery administration will know what the total payout for a game is while at the same time because a portion of the prizes are dynamic, it will have the ability to control the amount and timing of certain of the redemption values for the lottery tickets 22.

Because security is an important factor in lotteries, it is desirable that the systems such as 26 shown in FIG. 3, and the file structures such as the validation files 36 and the sub file 45 shown in FIG. 4 along with administrative procedures utilize the latest security technology. Preferably, only authorized lottery administrative personnel should be able to dynamically modify the value of the lottery tickets 22. One approach is to use the audit techniques described in U.S. patent application Ser. No. 10/317,577, assigned to the assignee of this application and which is hereby incorporated by reference. For example, the approach described in this patent application of using a read only memory to check the total prize value of a game can be used to test the integrity of the records 45 in the sub file.

The following is an example of how the game structure described above might operate. After purchasing the lottery ticket 22, the player scratches off the scratch-off material 16. If the play indicia 24 indicates that the lottery ticket 22 has a variable redemption value, e.g., the "Mystery Prize", the player, depending on the rules of the particular game, will have the option to: (1) redeem the lottery ticket 22 for its current value and/or (2) be included in the end of the game prize drawing. In one embodiment of the invention, these two options are mutually exclusive; in another embodiment, the Mystery prize winner is automatically entered in the End of Game draw, regardless of whether he has redeemed his ticket.

The redemption value of the prize during the game period can be, for example, $50 during week 1 of the game, $100 during week 2, back to $50 during week 3 etc. . . . as described above. In this example, the players can learn the redemption value of the lottery tickets 22 during the game by utilizing the Internet 44 or the 1–800 number 42. The players who opt to remain in the final draw held at the end of the game can likewise learn the value of their lottery tickets 22 via the public access system such as the Internet 44 or the 1-800 number 42. At any time until the game is closed, a player can redeem his Mystery ticket for the current posted value. In one embodiment, if he chooses to remain 'in the draw', his Mystery Prize ticket 22 is guaranteed to be of some minimal value. If he opts for the draw, he might win the top prize or some other high-valued prizes such as a car or a trip. Alternatively, the player might win some sort of relatively low value promotional item such as a t-shirt promoting the lottery. In another embodiment, the player can both redeem his Mystery Prize for its current value AND expect to be included in the End of Game draw.

Yet another embodiment of the invention will be described in terms of an electronic ticket with a simulated scratch-off material covering play indicia. In particular, a set of dashed lines 46 in FIGS. 1 and 2 represent a display of a video lottery terminal or a personal computer that can be connected to the host computer 32 to play an electronic version of an instant lottery game. Here, the lottery tickets 10 and 22 are electronic visual simulations of instant lottery tickets where the scratch-off coatings 16 can be removed by the player by operation of a mouse or some other control device connected to the terminal. Again, FIG. 3 depicts in block diagram form the basic hardware structure of the typical state administered lottery system 26 that can be used for selling and redeeming electronic lottery tickets such as lottery tickets 10 and 22. Included in the system 10 are a number of video lottery terminals 48A–C that can be for example video terminals in a gaming establishment or player owned personal computers. The video lottery terminals 48A–C can be connected, as represented by a set of lines 50A–C, to the lottery host compute 32 by a variety of mechanisms such as the internet or a lottery site controller 52 which in turn is connected to the host computer 32. The video lottery terminals 48A–C, as represented by the terminal 45A in FIG. 3, can include the graphical capabilities such as the display 46 for a lottery player to the play the electronic tickets 10 and 22 and a reader 52 for receiving credit cards or coupons to permit the player to play the game. Also, a printer 54 can be included or connected to the terminals 48A–C for printing out a payment voucher such as an eTicket 56 having for example a bar code 58 that can be used by a player to redeem a winning ticket at one of the agent terminals 28A–C. It should be noted that a variety of redemption mechanisms can be used including various internet secure payment systems. To enable a player to remove the simulated scratch-off coating 16, a control device 59 such as a keyboard or a mouse can be used with the video lottery terminals 48A–C. This system permits a player to pay for and play electronic tickets as well as 'cash out' when finished. The connections 50A–C to the host computer 32 can be dedicated lines, dial-up telephone lines or other methods of communication such as satellite or internet-based communications systems such as shown at 44.

As with the printed instant lottery games discussed above, it is typical practice in the United States lottery industry for a ticket vendor to provide a state lottery administration with one or more sets of "electronic" tickets such as lottery tickets 10 and 22 where each set is defined as a game. Each game will normally have a structure with a predetermined number of winning tickets and a predetermined number of losing tickets. Very often the winning tickets are divided between high tier winners which have a high winning prize value and low tier winners which have relatively low winning values. It is also industry practice for the vendor to supply the validation file 34 for each game, which is generally structured to contain one record having the redemption or prize value for each high tier winning ticket. In conventional game structures, the prize value in each record provided by the vendor is fixed or static. For some games, the validation file 34 will contain a record for each winning ticket or in some cases; the validation file 34 will contain a record for each lottery ticket in the game. This vendor supplied validation file is then loaded into the host computer validation file 18 using the data input device 38. In many state lotteries the practice is to require that the high tier lottery electronic ticket vouchers that are presented by a player to a lottery agent or a lottery validation system for redemption be validated by having the lottery agent or system transmit ticket identification information or the validation data 20 from the agent terminal 28A to the host computer 32. This information is then used to access a record in the validation file 34 which contains the redemption value for the lottery ticket 10 and this value is then transmitted back to the agent or validation terminal 28A.

Referring again to FIG. 4, in one embodiment of the invention, an instant lottery game structure is provided where an electronic lottery tickets, such as the lottery ticket 22, is displayed on the display 46 with the play indicia 24 which indicates to a player that the prize can have a variable value. The system 26 then functions essentially the same way the printed instant lottery system functions as described above.

The following is an example of how the electronic instant lottery game structure described above might operate in one embodiment of the invention. After selecting and purchasing the electronic lottery ticket 22 at the video lottery terminal 48A, the player receives a graphical representation of his selected 'pull' or ticket 10 or 22. If the play indicia 24 indicates that the lottery ticket 22 has a variable redemption value, e.g., the "Mystery Prize", the player will have the option to: (1) redeem the lottery ticket 22 for its current value or (2) opt to be included in the end of the game prize drawing. The redemption value of the prize during the game period can be, for example, $50 during week 1 of the game, $100 during week 2, back to $50 during week 3, etc. . . . as described above. In this example, the players can learn the redemption value or any other value or non-value of the lottery administration's choosing of the lottery tickets 22 during the game by utilizing an information access system such as the Internet 44, the 1-800 number 42 or, in this case, the video lottery terminals 48A–C. The players who opt to remain in the final draw held at the end of the game can also learn the value of their lottery tickets 22 via the Internet 44, the 1-800 number 42 or the video lottery terminals 48A–C. At any time until the game is closed, a player can redeem his Mystery ticket for the current posted value. If he chooses to remain 'in the draw', his Mystery Prize ticket 22 is guaranteed to be of some minimal value. If he opts for the draw, he might win the top prize or some other high-valued prizes such as a car or a trip. Alternatively, the player might win some sort of relatively low value promotional item such as a t-shirt promoting the lottery or nothing.

In another embodiment of the invention, the player can both redeem his electronic Mystery Prize for its current value AND expect to be included in the End of Game draw.

The existence of Mystery Prizes tickets 22 within an instant (or an electronic game) and the Mystery Prize Validation sub file 45 delivered to the Lottery administration can form the basis for the electronic End of Game (or End of Sales) draw. The validation numbers 20 of the Mystery Prize winning tickets 22 are separately stored in the validation sub file 45 (or in another embodiment, a special prize code identifies the Mystery Prize winners in the traditional validation file 34.) In either case, the electronic draw is based on these validation numbers 20 which uniquely identify the population of all Mystery Prize winning tickets within the game.

Valid or redeemed Mystery Prize winners within a game can be further identified by a voucher that is produced at the agent terminal 28A upon redemption of the Mystery Prize winning ticket 22. At this point, player information can be recorded in a database. Alternatively, the Internet 44 or a 1-800 number 42 can be used to identify validated Mystery Prize winners. There can be other methods of identifying those lottery players who have indeed won a Mystery Prize. The result of the identification is to populate or mark the validation sub file 45 with valid Mystery Prize winners who are eligible for the electronic drawing.

By the methods described above, once the lottery has satisfactorily populated the validation sub file 45 with valid Mystery Prize winners, the Lottery can choose one of the records 45 from this file. Typically, this would occur at some predetermined point in the lifecycle of the game, for example the end of retail sales for the game. The selection of this single record 45 can be accomplished using several common methods, but the most common is the use a specialized random number generator by the host computer 32. This random number generator would identify ONE of the Mystery Prize winners as the Grand Prize Winner—and thus distribute the remaining Top Prize in the Game to this individual Mystery Prize winner. Since Mystery Prize tickets 22 are available throughout the sales of the game, all lottery players will have the opportunity to play for the top prize until the game sales have been halted by the Lottery Administration.

It will be understood that the dynamic game structure concepts described above can also be applied to non-gambling games. As an example, this type of structure can be used with supermarket type sweepstakes where sweepstake coupons are not sold.

I claim:

1. A lottery game structure comprising:
   a set of instant lottery tickets wherein each said instant lottery ticket includes a prize indicia covered by a removable covering such that at least a first portion of said lottery tickets have said prize indicia representing a variable prize corresponding to a variable prize;
   a memory adapted for storing said variable prize code wherein said variable prize code represents a variable redemption value when redeemed for each said first portion of said lottery tickets; and
   a computer operatively connected to said memory effective to change at least one of said variable prize codes for said first portion of said lottery tickets.

2. The game structure of claim 1 wherein said computer performs said change according to predetermined criteria.

3. The game structure of claim 2 wherein said predetermined criteria includes a predetermined time to make said change.

4. The game structure of claim 1 wherein said computer performs said change by randomly assigning a value to said variable prize codes for at least one said first portion of said lottery tickets.

5. The game structure of claim 1 additionally including an administration terminal operatively connected to said computer wherein said change can be made via said administration terminal.

6. The game structure of claim 1 wherein said lottery tickets are printed instant lottery tickets and said prize indicia are printed on said lottery tickets below said removable covering which includes a scratch-off material.

7. The game structure of claim 1 wherein said lottery tickets are electronically simulated instant lottery tickets adapted for display on a plurality of video lottery terminals and said removable covering can be removed by operation of a control device connected to said video lottery terminals.

8. The game structure of claim 1 wherein a second portion of said lottery tickets have prize indicia representing a prize value and a third potion of said lottery tickets have prize indicia indicating that said lottery tickets have no prize value.

9. The game structure of claim 8 wherein said memory includes a static prize codes for each said second portion of said lottery tickets corresponding to said prize indicia.

10. The game structure of claim 1 wherein said variable prize codes have a first predetermined value at a first predetermined time and said change occurs at a second predetermined time after said first predetermined time.

11. The game structure of claim 10 wherein said change includes said selecting a second predetermined value and randomly selecting at least one of said variable prize codes in said memory and changing said selected variable prize code to said second predetermined value.

12. The game structure of claim 1 including a ticket redemption mechanism operatively connected to said computer effective to identify said lottery tickets having said variable prize codes that have been redeemed and wherein said variable prize codes that are changed are selected from said variable prize codes associated with a set of said lottery tickets that have not been redeemed.

13. The game structure of claim 12 wherein said variable prize codes have a first predetermined value at a predetermined time and said change occurs at a second predetermined time after said first predetermined time and wherein said change includes said selecting a second predetermined value and randomly selecting at least one of said variable prize codes associated with a set of said lottery tickets that have not been redeemed and changing said selected variable prize code to said second predetermined value.

14. The game structure of claim 10 wherein said computer is also effective to change at a third predetermined time least a portion of said prize codes that were not selected for change to said second predetermined value to a third predetermined value.

15. The game structure of claim 14 wherein said first and second predetermined times occur at the same time.

16. A lottery game structure comprising:
   a set of instant lottery tickets wherein each said instant lottery ticket includes a prize indicia covered by a removable covering indicating that a first portion of said lottery tickets are variable tickets having a variable prize value, a second portion of said lottery tickets are static tickets having a static prize value and a third portion of said lottery tickets are non-winning tickets having no prize value;
   a validation file storing a variable prize code corresponding to a variable prize value for each said variable tickets and a static prize code for said static tickets; and
   a host computer operatively connected to said memory effective to change at least one of said variable prize values by changing the corresponding variable prize codes for said variable tickets.

17. The game structure of claim 16 wherein said lottery tickets are printed instant lottery tickets and said prize indicia are printed on said lottery tickets below said removable covering which includes a scratch-off material.

18. The game structure of claim 16 including a plurality of video lottery terminals having a display and a control device and wherein said lottery tickets are electronically simulated instant lottery tickets adapted for display on said display and said removable covering can be removed by said control device.

19. The game structure of claim 16 wherein there are substantially more of said static tickets than said variable tickets.

20. The game structure of claim 16 wherein said variable prize codes are stored in a sub file of said validation file.

21. The game structure of claim 16 wherein said prize indicia on said variable tickets provides direction to the player as to how to redeem said variable tickets.

22. The game structure of claim 16 wherein said change includes said host computer randomly selecting at least one of said variable prize codes to change to a first value.

23. The game structure of claim 16 wherein said host computer at a first predetermined time changes a plurality of said variable prize codes to a first value.

24. The game structure of claim 23 wherein said host computer at a second predetermined time after said first predetermined time changes at least a portion of said plurality said variable prize codes to a second value.

25. The game structure of claim 16 including an administration terminal operatively connected to said host computer wherein said administration terminal can cause said change of at least one of said variable prize codes.

26. The game structure of claim 16 including a ticket redemption mechanism operatively connected to said host computer effective to identify in said validation file said variable tickets that have been redeemed and wherein said variable prize codes that are changed are selected from said variable prize codes associated with a set of said variable tickets that have not been redeemed.

27. The game structure of claim 26 wherein said variable prize codes that are changed are randomly selected from said variable prize codes associated with said set of variable tickets that have not been redeemed.

28. The game structure of claim 16 wherein said set of instant lottery tickets represents a game having a termination date and said change is made after said termination date.

29. The game structure of claim 28 including a ticket redemption mechanism operatively connected to said host computer effective to identify in said validation file said variable tickets that have been redeemed and wherein said variable prize codes that are changed are randomly selected from said variable prize codes associated with a set of said variable tickets that have not been redeemed.

30. The game structure of claim 16 including a ticket redemption mechanism operatively connected to said host computer effective to identify in said validation file said variable tickets that have been redeemed wherein said computer at a first predetermined time performs said change to said prize codes associated with said variable tickets that have not been redeemed wherein said prize codes are changed to the same first value.

31. The game structure of claim 30 wherein said host computer at a second predetermined time performs said change to said variable tickets that have not been redeemed wherein said host computer selects at least one of said prize codes associated with said variable tickets that have not been redeemed to change to a second value.

32. The game structure of claim 31 wherein said set of instant lottery tickets represents a game having a termination date and said second predetermined time is after said termination date and said host computer randomly selects said at least one of said prize codes associated with said variable tickets that have not been redeemed to change to said second value and wherein said second value is substantially greater than said first value.

33. The game structure of claim 16 including a ticket redemption mechanism to identify in said validation file said variable tickets that have been redeemed and an access system operatively connected to said host system wherein the prize value of at least one of said variable tickets can be determined by a player.

34. The game structure of claim 33 wherein said variable tickets have a first prize value at a first predetermined time and wherein at a second predetermined time after said first predetermined time said host computer randomly selects said at least one of said prize codes associated with said variable tickets that have not been redeemed to change to a second value and wherein said second value is substantially greater than said first prize value and wherein the player has the option of using said access system and said redemption mechanism to redeem said at least one of said variable tickets before or after said second predetermined time.

35. The game structure of claim 34 wherein said set of instant lottery tickets represents a game having a termination date and said second predetermined time is after said termination date.

36. A lottery game method comprising the steps of:
providing a set of instant lottery tickets wherein said instant lottery ticket includes a prize indicia covered by a removable covering indicating that at least a first portion of said lottery tickets are variable tickets having a variable prize value;
storing a variable prize code representing a first prize value for each of said variable tickets in a memory associated with a host computer; and
changing at least one of said variable prize codes stored in said memory from a first value representing said first prize value to a second value representing a second prize value.

37. The method of claim 36 including printing said set of said instant lottery tickets wherein said prize indicia are printed on said lottery tickets and applying said removable covering which includes a scratch-off material over said prize indicia.

38. The method of claim 36 including electronically simulating said set of instant lottery tickets for display on a display of a video lottery terminal having a control device and permitting a player to removable said removable covering using said control device.

39. The method of claim 36 wherein said step of providing said set of instant lottery tickets includes providing a second portion of said lottery tickets that are static tickets having a static prize value with said prize indicia indicating said static prize value and storing a static prize code representing said static prize value for each of said static tickets in said memory.

40. The method of claim 36 including the step of determining which of said variable tickets have been redeemed and selecting at least one of said variable prize codes corresponding to a non redeemed variable ticket for said changing to said second prize value.

41. The method of claim 40 said step of selecting includes randomly selecting one or more of said variable prize codes corresponding to said non redeemed variable tickets for changing into said second prize value.

42. The method of claim 41 wherein said first prize code value is equal for all said non redeemed variable tickets and said first prize value is non zero.

43. The method of claim 42 including the step of changing said variable prize code values corresponding to all said non redeemed variable tickets from said first prize value to a third prize value prior to said step of changing to said second prize value.

44. The method of claim 41 including the steps of permitting a player to access said host computer to determine said first prize value and permitting the player to redeem at least one of said variable ticket having said first prize value or after a predetermined time permitting the player to redeem at least one of said variable tickets having said second prize value.

45. The method of claim 42 wherein said set of instant lottery tickets represents a game having a termination date and said predetermined time is after said termination date and said second prize value is substantially greater than said first prize value.

* * * * *

UNITED STATES PATENT AND TRADEMARK OFFICE
CERTIFICATE OF CORRECTION

PATENT NO. : 7,153,206 B2 Page 1 of 1
APPLICATION NO. : 10/370317
DATED : December 26, 2006
INVENTOR(S) : Joseph W. Bennett, III It is certified that error appears in the above-identified patent and that said Letters Patent is hereby corrected as shown below:

Title Pg, Item (73), Scientific "Gaines" Royalty Corp. should be changed to Scientific --Games-- Royalty Corp. as the Assignee.

Signed and Sealed this

First Day of July, 2008

JON W. DUDAS
*Director of the United States Patent and Trademark Office*